(12) United States Patent
Yu et al.

(10) Patent No.: US 8,967,997 B2
(45) Date of Patent: Mar. 3, 2015

(54) SYSTEM AND COMPONENTS FOR EVALUATING THE PERFORMANCE OF FIRE SAFETY PROTECTION DEVICES

(75) Inventors: Hong-Zeng Yu, Foxboro, MA (US); Stephen P. D'Aniello, Franklin, MA (US)

(73) Assignee: Factory Mutual Insurance Company, Johnston, RI (US)

(*) Notice: Subject to any disclaimer, the term of this patent is extended or adjusted under 35 U.S.C. 154(b) by 352 days.

(21) Appl. No.: 13/371,630

(22) Filed: Feb. 13, 2012

(65) Prior Publication Data
US 2013/0205889 A1 Aug. 15, 2013

(51) Int. Cl.
F23C 1/00 (2006.01)
F23D 14/02 (2006.01)
F23C 5/08 (2006.01)

(52) U.S. Cl.
CPC .. *F23D 14/02* (2013.01); *F23C 5/08* (2013.01)
USPC ............................. 431/284; 431/285; 431/278

(58) Field of Classification Search
CPC ......... F23D 14/02; F23D 14/58; F23D 14/70; F23C 5/08; F23N 5/00; F23N 2037/02
USPC ......... 431/284, 285, 278, 8, 9, 354; 126/39 E
See application file for complete search history.

(56) References Cited

U.S. PATENT DOCUMENTS

| | | |
|---|---|---|
| 2,073,448 A | 3/1937 | Fruth et al. |
| 3,017,920 A | 1/1962 | Blockley et al. |
| 3,904,126 A | 9/1975 | Allard |
| 4,303,386 A | 12/1981 | Voorheis et al. |
| 4,303,396 A | 12/1981 | Swiatosz |
| 4,507,076 A | 3/1985 | Babington |
| 5,133,658 A | 7/1992 | Le Monnier De Gouville et al. |
| 5,518,403 A | 5/1996 | Luftig et al. |
| 5,558,515 A | 9/1996 | Althaus et al. |
| 5,573,394 A | 11/1996 | Pershina |
| 5,842,849 A * | 12/1998 | Huang .......................... 431/284 |
| 6,085,585 A | 7/2000 | Yu et al. |
| 6,257,875 B1 | 7/2001 | Johnstone et al. |

(Continued)

FOREIGN PATENT DOCUMENTS

| | | |
|---|---|---|
| CN | 201732012 U | 2/2011 |
| EP | 0 634 608 A2 | 1/1995 |

(Continued)

OTHER PUBLICATIONS

International Search Report issued Mar. 29, 2013 in related International Patent Application No. PCT/US2012/067611.

(Continued)

*Primary Examiner* — Alfred Basichas
(74) *Attorney, Agent, or Firm* — Venable LLP; Steven J. Schwarz

(57) ABSTRACT

A burner for a fire plume generator includes a liquid fuel nozzle directed along a first axis, a peripheral shield extending around the liquid fuel nozzle, the peripheral shield extending substantially along the first axis and defining an upper end and a lower end, and a pilot flame manifold located at or above the upper end of the peripheral shield, the pilot flame manifold defining a plurality of pilot flame outlets. A fire plume generator, a fire safety protection evaluation system, and a method of evaluating a fire safety protection device are also disclosed.

17 Claims, 9 Drawing Sheets

(56) References Cited

U.S. PATENT DOCUMENTS

| | | |
|---|---|---|
| 6,779,399 B2 | 8/2004 | Liljegren et al. |
| 6,905,329 B2 | 6/2005 | Wong |
| 7,744,373 B2 | 6/2010 | Williamson et al. |
| 8,028,438 B2 | 10/2011 | Pedtke |
| 2003/0124496 A1 | 7/2003 | Hough |
| 2007/0254251 A1 | 11/2007 | Cao et al. |

FOREIGN PATENT DOCUMENTS

| | | |
|---|---|---|
| EP | 1334749 A1 | 8/2003 |
| JP | 63-113210 A | 5/1988 |
| JP | 9-262314 A | 10/1997 |
| JP | 2001 095944 A | 4/2001 |
| SU | 1358850 A1 | 12/1987 |
| UA | 29184 U | 1/2008 |

OTHER PUBLICATIONS

Written Opinion of the International Searching Authority issued Mar. 29, 2013 in related International Patent Application No. PCT/US2012/067611.

Zhu, "Experimental Performance Evaluation of Water Mist Fire Suppression System," The Hong Kong Polytechnic University, Dec. 31, 2009.

\* cited by examiner

SYSTEM AND COMPONENTS FOR EVALUATING THE PERFORMANCE OF FIRE SAFETY PROTECTION DEVICES

TECHNICAL FIELD

This patent application relates generally to systems and components for evaluating the performance of fire safety protection devices, such as sprinklers and nozzles. More specifically, this patent application relates to fire plume generators, and fluid collection systems, for evaluating the performance of fire safety protection devices under strong sprinkler and nozzle sprays.

BACKGROUND

Applicant's U.S. Pat. No. 6,085,585 to Yu et al., the entire content of which is incorporated herein by reference, relates to a sprinkler performance evaluation system for measuring the effectiveness of a sprinkler system for warehouse fire protection. The system evaluates, among other things, the actual water density (ADD) delivered by the sprinkler system through the fire plume to the top of storage stacks which have been ignited, and the prewetting density (PWD) on the commodity stacks adjacent to the ignited stacks.

The system disclosed in the '585 patent generally includes a burner system that produces a fire plume, and a ceiling for suspending a sprinkler system above the fire plume. The system also includes a fluid collection system having a series of pans under and around the periphery of the burner system to collect fluid (e.g., water) from the sprinklers that passes through the fire plume, and/or around the fire plume. The pan collection system measures the amount and rate of fluid collected by the pans, and provides a measurement of the ADD and PWD produced by the sprinkler system.

SUMMARY

According to an embodiment, a burner for a fire plume generator comprises a liquid fuel nozzle directed along a first axis; a peripheral shield extending around the liquid fuel nozzle, the peripheral shield extending substantially along the first axis and defining an upper end and a lower end; and a pilot flame manifold located at or above the upper end of the peripheral shield, the pilot flame manifold defining a plurality of pilot flame outlets.

According to another embodiment, a fire plume generator comprises a first burner and plurality of second burners arranged around the first burner, wherein each of the first and second burners comprises a liquid fuel nozzle, a peripheral shield extending around the liquid fuel nozzle, and a pilot flame manifold located at or above an upper end of the peripheral shield; a source of liquid fuel in communication with the liquid fuel nozzles; a source of gaseous fuel in communication with the pilot flame manifolds; and a duct located below the first burner, the duct adapted to produce upward airflow toward the first burner.

According to yet another embodiment, a fire safety protection evaluation system comprises at least one horizontal collection device including a substantially horizontal liquid collection pan, a first storage container in communication with the horizontal liquid collection pan, and a first measuring device adapted to measure an amount of liquid in the first storage container and/or a rate of liquid entering the first storage container; at least one vertical collection device including a substantially vertical liquid collection surface defining a top edge and a bottom edge, and a trough located along the bottom edge, the vertical collection device further comprising a second storage container in communication with the trough, and a second measuring device adapted to measure an amount of liquid in the second storage container and/or a rate of liquid entering the second storage container.

According to yet another embodiment, a method of evaluating a fire safety protection device comprises generating a fire plume underneath at least one fire safety protection device; collecting fluid delivered from the at least one fire safety protection device to at least one substantially horizontal collection surface located underneath the at least one fire safety protection device; collecting fluid delivered from the at least one fire safety protection device to at least one substantially vertical collection surface facing the at least one substantially horizontal collection surface; and measuring the fluid collected by at least one of the substantially horizontal collection surface and the substantially vertical collection surface.

Further objectives and advantages, as well as the structure and function of preferred embodiments, will become apparent from a consideration of the description, drawings, and examples.

BRIEF DESCRIPTION OF THE DRAWINGS

The foregoing and other features and advantages of the invention will be apparent from the following, more particular description, as illustrated in the accompanying drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. While specific embodiments are discussed, it should be understood that this is done for illustration purposes only. A person skilled in the relevant art will recognize that other components and configurations can be used without departing from the spirit and scope of the invention. All references cited herein are incorporated by reference as if each had been individually incorporated.

Figure 1:
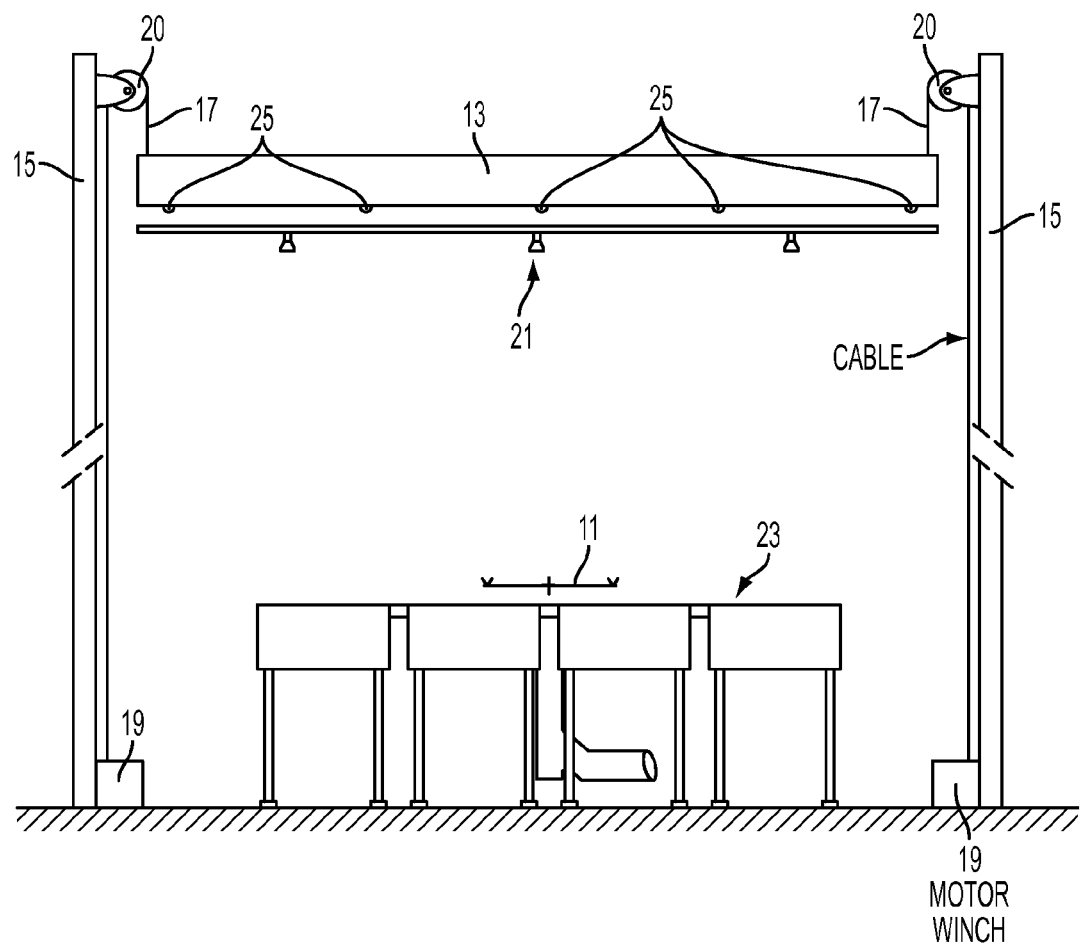
FIG. 1 is a schematic view of a prior art sprinkler performance evaluation system.

Referring to FIG. 1, a sprinkler performance evaluation system according to applicant's prior art U.S. Pat. No. 6,085,585 is shown. The system comprises a burner system 11 positioned at a convenient height above the building floor designed to produce a flame plume like that produced by a burning commodity stack in a warehouse. Positioned over the burner system 11 is a ceiling 13 which is supported at its four corners from steel beams 15 by means of cables 17 which are connected on pulleys 20 and connect to motorized winches 19 mounted at the bases of the four steel beams 15. By means of the winches 19, the vertical position of the ceiling 13 over the flame can be adjusted to different levels. (While the '585 patent describes the use of cables 17 and winches 19 to adjust the ceiling height, other structures could alternatively be used, such as vertical jack screws and motors.)

The '585 patent describes that the lower surface of the ceiling 13 is defined by refractory ceiling tiles which are supported on steel trusses. Suspended from the ceiling 13 is the sprinkler system 21 to be tested. Positioned about 6 inches beneath the burner system 11 is a pan collection system 23 containing a series of pans, some of which are positioned directly under the fire plume generated by the burner system 11 to collect the water from the sprinkler system 21 passing through the fire plume and some of which are positioned around the periphery of the burner 11 to collect the water from the sprinkler system which would wet the areas around the fire plume. The pans positioned around the periphery of the burner collect water passing around the periphery of the plume and may collect some water which passes through the flame, since some of the sprinklers may be at some distance from the vertical center line of the plume and water drops entering the plume from one side may pass through the plume and land in pans on the other side of the plume. Thermocouples 25 are deployed at strategic locations under and adjacent to the ceiling 13 to measure the fire gas temperature under and adjacent to the ceiling.

FIGS. 2-5 depict a burner 100 according to an embodiment of the present invention. The burner 100 can be used alone, or in combination with other burners, to produce a fire plume for testing a first safety protection system, such as a network of sprinklers or nozzles. Embodiments of the burner 100 can be used alone, or in combination with other burners, to produce a fire plume with a heat output over 2,500 kW. For example, according to an embodiment, the burner 100, alone or in combination with other burners, can produce a fire plume with a heat output in the range from about 0.5 MW up to about 7.5 MW, or even greater, such as 10 MW. For ease of explanation, the term "sprinkler" will be used to refer generically to sprinklers, nozzles, and other types of fire protection safety devices that emit water or other fluids to suppress fire. One of ordinary skill in the art will recognize from this disclosure that the burner 100 may have other uses besides testing a fire safety protection system.

Figure 2:
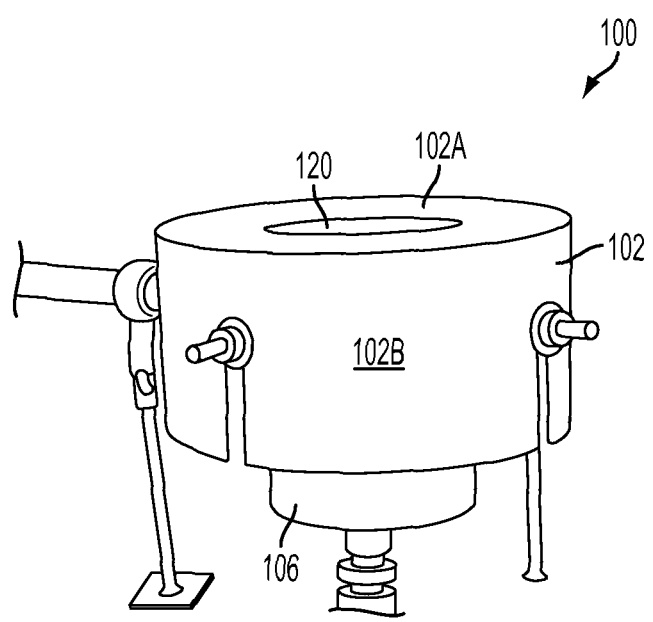
FIG. 2 is a perspective view of an embodiment of a burner for a fire plume generator according to the present invention.
Figure 3:
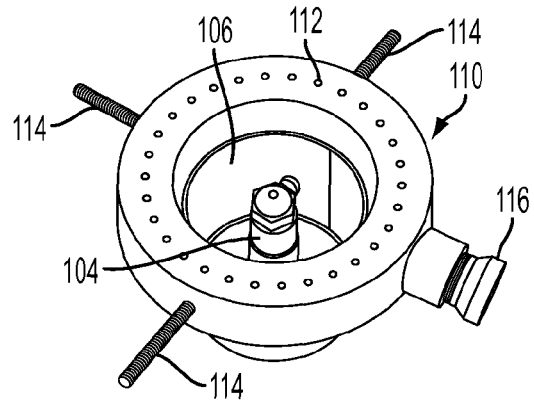
FIG. 3 is a perspective view of the burner of FIG. 2, shown with a upper shield removed.
Figure 4:
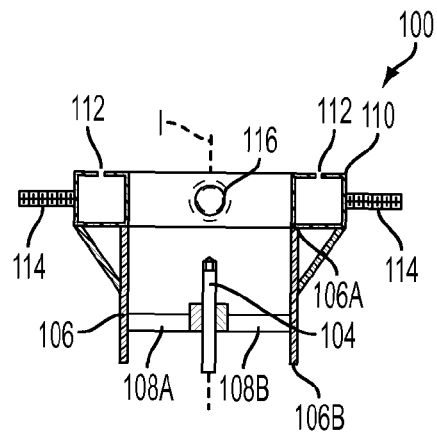
FIG. 4 is a side cross-sectional view of the burner of FIG. 3.
Figure 5:
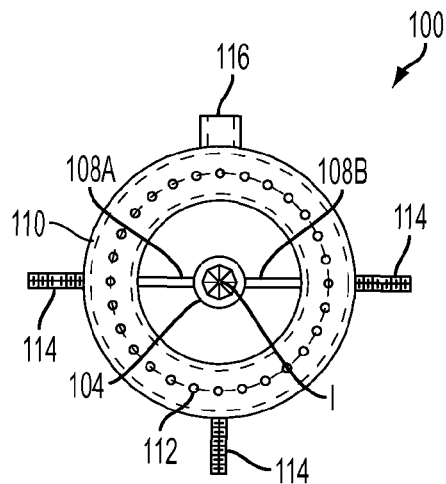
FIG. 5 is a top view of the burner of FIG. 3.

In FIG. 2, an embodiment of the burner 100 is shown with its upper shield 102 in place. In FIGS. 3-5, the burner 100 is shown, for illustration purposes, with the upper shield 102 removed. Referring to FIGS. 3-5, the burner 100 can include a liquid fuel nozzle 104 for emitting a spray of liquid fuel, such as a heptane spray, to create a flame and induce an air flow around the liquid fuel nozzle 104. According to alternative embodiments, the liquid fuel nozzle can use liquid fuels such as, without limitation, gasoline, diesel, fuel oil, and jet fuel.

The liquid fuel nozzle 104 can be directed generally along a first axis I (see FIG. 4). The burner 100 can also include a peripheral shield 106 that surrounds the liquid fuel nozzle 104. The nozzle 104 can be mounted or otherwise supported in the peripheral shield 106, for example, using cross-members 108A, 108B, however, one of ordinary skill in the art will appreciate that other structures can be used to support the nozzle 104 with respect to the peripheral shield 106.

With reference to FIG. 4, the peripheral shield 106 can have a central axis (not labeled) that is substantially aligned, or coaxial, with the first axis I of the nozzle 104. For example, according to the embodiment shown, the peripheral shield 106 can be substantially cylindrical in shape, and can define a central axis aligned with the first axis I. One of ordinary skill in the art will appreciate, however, that other shapes besides cylindrical are possible.

As shown in FIG. 4, the peripheral shield 106 can include an upper end 106A and a lower end 106B. According to an embodiment, the upper end 106A extends above and protects the tip of liquid fuel nozzle 104, e.g., from air or liquid impinging from the side. According to an embodiment, the peripheral shield can define a diameter of between about 2.5" and 3.5", for example, about 3", and can define a length between the upper end 106A and the lower end 106B of between about 2.5" and 3.5", for example, about 3", however, other dimensions are possible.

Still referring to FIGS. 3-5, the burner 100 can also include a pilot flame manifold 110 located, for example, at or above the upper end 106A of the peripheral shield 106. The pilot flame manifold 110 can define a plurality of pilot flame outlets 112, for example, for releasing a gas, such as a mixture of air and propane. According to an embodiment, the pilot flame manifold 110 can be substantially ring-shaped, and can have a plurality of pilot flame outlets 112 distributed about its upper surface. According to an embodiment, the pilot flame outlets can comprise between 16 and 56, for example, 28 micro-nozzles, evenly distributed about the pilot flame manifold 110. Each micro-nozzle can have a diameter in the range from about 0.125" to about 0.150", however, other sizes and numbers of nozzles are possible. While the pilot flame manifold 110 is shown and described herein as ring-shaped, other shapes are possible, such as square, rectangular, or triangular. According to alternative embodiments, the micro-nozzles can release butane, methane, ethane, or other gasses and air/gas mixtures.

The pilot flame manifold 110 can be connected at or near the upper end 106A of the peripheral shield 106, for example, by welding, bonding, or other methods known in the art. Alternatively, the pilot flame manifold 110 can be integral with the peripheral shield 106. The pilot flame manifold 110 can include mounting brackets 114, such as threaded studs or other structures, for securing the upper shield 102. The pilot flame manifold 110 can also include a coupling 116 for connection to a supply of gaseous fuel, such as a mixture of propane and air, as will be discussed in more detail below.

Still referring to FIGS. 3-5, an embodiment of the pilot flame manifold 110 can define an inner diameter of between about 2.5" and 3.5", or alternatively, between about 2.75" and 3.25". According to an embodiment, the inner diameter of the pilot flame manifold can be about 3". The pilot flame manifold 110 can define an outer diameter of between about 4.5" and 5.5", for example, about 5", however, other dimensions are possible. According to an embodiment, the pilot flame manifold 110 can define a height (e.g., along first axis I) of between about 0.5" and 1.5", for example, about 1". The pilot flame manifold 110 can have a substantially square cross-section, as shown in FIG. 4, or alternatively, can have a circular cross-section, or other shape.

Referring to FIG. 2 in conjunction with FIGS. 6-9, the upper shield 102 will be described in more detail. When in place, the upper shield 102 is located on the burner 100 above the pilot flame manifold 110. The upper shield 102 can include a first portion 102A that extends horizontally over the pilot flame manifold 110 (e.g., substantially perpendicular to the first axis I), for example, to block water droplets or other fluids from contacting the pilot flame manifold 110. The first portion 102A can include a central opening 120 through which the flame generated by the burner exits. According to an embodiment, the first portion 102A can define an outer diameter of between about 5.5" and 6.5", for example, about 6", however, other dimensions are possible. According to an embodiment, the central opening 120 can define a diameter of between about 2.5" and about 3.5", for example, about 3", however, other dimensions are possible. While the upper shield 102 is shown and described as being substantially cylindrical, other shapes, such as square, rectangular, and triangular are also possible.

Figure 6:
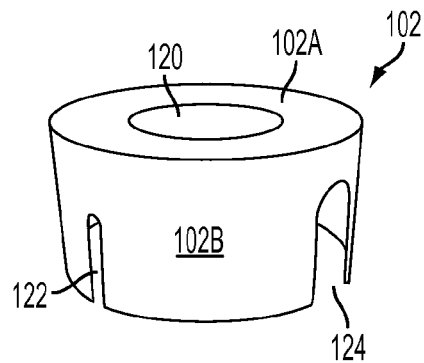
FIG. 6 is a perspective view of an embodiment of the upper shield of FIG. 2, shown removed from the burner.
Figure 7:
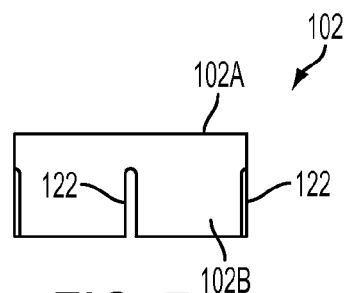
FIG. 7 is a back view of the upper shield of FIG. 6.
Figure 8:
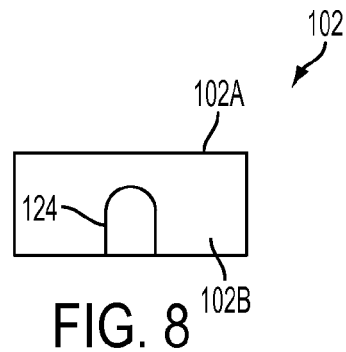
FIG. 8 is a front view of the upper shield of FIG. 6.
Figure 9:
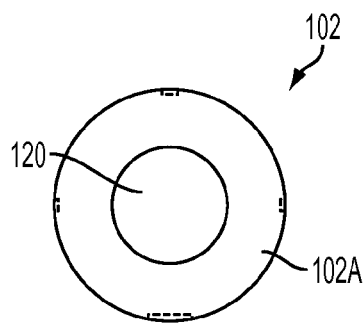
FIG. 9 is a top view of the upper shield of FIG. 6.

Referring to FIGS. 6, 8 and 9, the upper shield 102 can further include a second portion 102B that extends substantially parallel to the first axis I, for example, downward around the burner 100. The second portion 102B can protect the flame from being blown off the liquid fuel nozzle 104 in the event of strong air currents from the side. According to an embodiment, the second portion 102B can include mounting slots 122, or other structures, to mount the upper shield 102 on the burner, for example, by receiving the mounting brackets 114 located on the pilot flame manifold 110 and corresponding fasteners. The mounting slots 122 can be elongated to permit vertical adjustment of the upper shield's position with respect to the liquid fuel nozzle 102 and/or the pilot flame manifold 110. The second portion 102B of the upper shield 102 can also include a clearance 124 to permit passage of the coupling 116 on the pilot flame manifold 110. According to an embodiment, the second portion 102B of the upper shield 102 can define a height of between about 2.0" and 4.0", for example, about 3", however, other dimensions are possible.

According to an embodiment, the underside of the first portion 102A of the upper shield 102 can be located at a vertical distance of between about 1.5" and about 3.0", for example, about 2.5", above the tip of liquid fuel nozzle 104. Additionally or alternatively, the underside of the first portion 102A can be located at a vertical distance of between about 0.5" and 1.5", or between about 0.5" and about 1.25" above the pilot flame outlets 112 in the pilot flame manifold 110. According to an embodiment, the underside of the first portion 102A of the upper shield 102 can be located at a vertical distance of about 1" above the pilot flame outlets 112.

According to an embodiment, the tip of the fuel nozzle 104 can be at a substantially vertical distance of about 0.5" to about 2.5" below the pilot flame outlets 112 in the pilot flame manifold 110. According to another embodiment, the tip of the fuel nozzle 104 can be at a substantially vertical distance of about 1.0" to about 1.5" below the pilot flame outlets 112 in the pilot flame manifold 110. One of ordinary skill in the art will appreciate from this disclosure, however, that the burner 100 can have other dimensions and relative distances than those specified above, for example, based on the operating conditions and desired fire plume properties.

According to an embodiment, the components of the burner 100, such as, for example, the peripheral shield 106, the manifold 110, the nozzle 104, and/or the upper cover 102 can be made from heavy gauge metal, such as stainless steel having a thickness of at least 11 gage. Other materials are possible, however, as will be understood by one of ordinary skill in the art.

Figure 10:
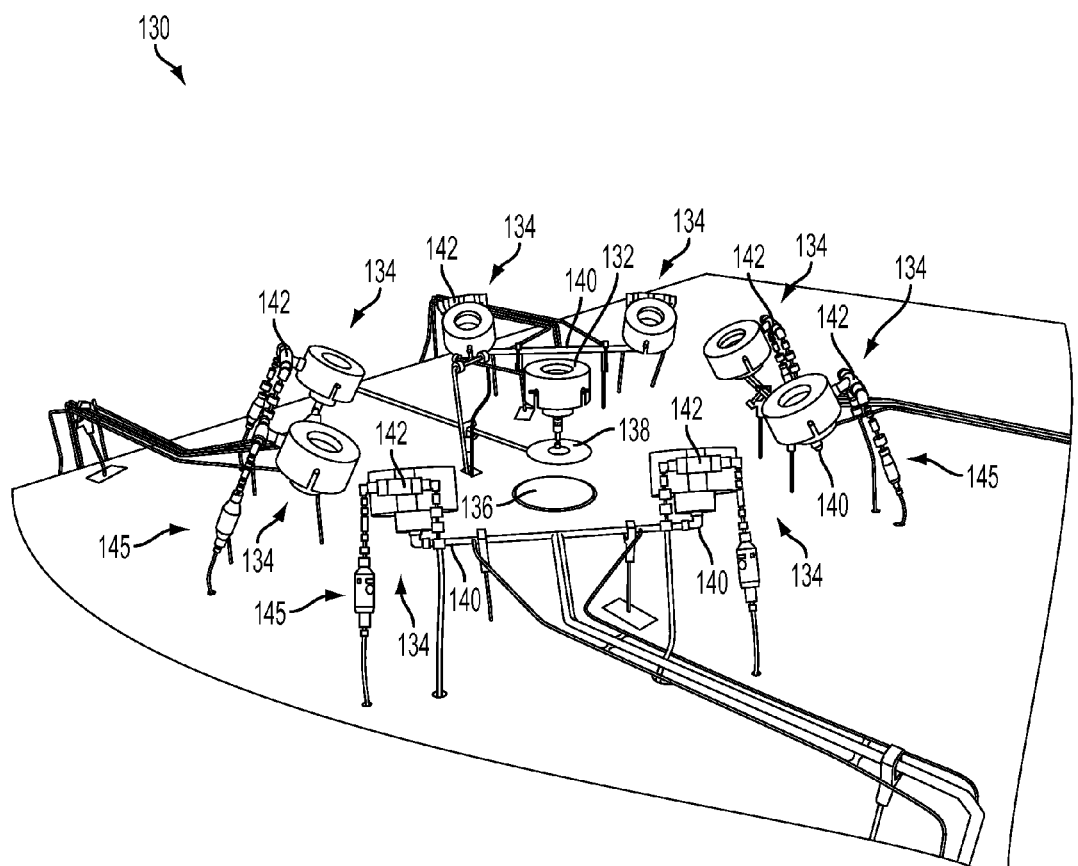
FIG. 10 is a perspective view of an embodiment of a fire plume generator according to the present invention.

Referring to FIG. 10, an embodiment of a fire plume generator 130 according to the present invention is shown. The fire plume generator 130 can comprise a plurality of the burners 100, for example, as described in connection with FIGS. 2-9. In an embodiment, the fire plume generator 130 can comprise a first, centrally arranged burner 132 (e.g., similar to burner 100) and a plurality of second, peripheral burners 134 (e.g., similar to burner 100) arranged around the first burner 132, for example, in a circle, however other patterns are possible. According to an embodiment, eight of the peripheral burners 134 can be arranged around the central burner 132 in an approximately 4 foot diameter circle, however, other embodiments are possible. According to the embodiment shown in FIG. 10, an air discharge duct 136 can be located underneath the central burner 132. For example, the duct 136 can comprise an 8" duct positioned between about 10" and 15", for example, about 13", below the central burner 132. According to an embodiment, airflow through the duct 136 can be moved by a blower connected to the duct 136, for example, by a tube. A blast gate by-pass can be used to adjust the airflow rate through the duct 136. According to an embodiment, the blower can have a capacity of about 3,000 c.f.m. at 14 inches of water, however, other burner capacities can be used.

A substantially flat, deflector disk 138 can be located between the first burner 132 and the duct 136, for example, to maintain an air recirculation zone below the first burner 132 when air is discharged from the duct 136. Additionally or alternatively, the deflector disk 138 can serve as a flame holder to protect the flame from overpowering air currents from below. According to an embodiment, the deflector disk 138 can have a diameter of about 6.5" and can be located about 4" below the central burner.

As shown in FIG. 10, liquid fuel, such as heptane, can be supplied to each of the burners 132, 134, for example, using one or more networks of pipes 140 connected to the respective liquid fuel nozzles 104. According to an embodiment, all or a portion of the pipes 140 can comprises a double-jacketed stainless steel feed line, which allows water to pass through an annular area in the feed line to cool heptane flowing in the pipes 140. A flow meter, such as a turbine flow meter, can be used to monitor the total heptane flow rate.

Gaseous fuel, such as an approximate 8-to-1 propane/air mixture, can be supplied to the respective pilot flame manifolds 110, for example, by using one or more networks of pipes 142, e.g., stainless steel tubing, connected to the manifolds, e.g., via the couplings 116. According to an embodiment, air supply to the manifolds 110 can be metered by a mass flow controller, for example, at a rate of between about 700 lpm and about 800 lpm. The propane can be supplied to the manifolds 110 in a similar manner, for example, using a separate mass flow controller to provide propane at a rate of between about 50 lpm and 70 lpm. A flame flashback arrestor 145 can be located in the propane supply prior to entry into each manifold 110.

The burners 100 can all be located on approximately the same horizontal plane. According to an embodiment, the center burner 132 can be pointed about 90 degrees upward, while the peripheral burners 134 are angled toward the center burner 132 in order to produce the desired fire plume. The fire plume generator 130 can be located above a fluid collection system, for example, as described in connection with FIGS. 11-13B, below.

In testing, the fire plume generator 130 shown in FIG. 10 has produced fire plumes with a heat output ranging from between about 0.5 MW to about 7.5 MW, or greater, in comparison with prior art plume generators which have been limited by a 2,500 kW heat output capacity. In use, the fire plume generator 130 can be operated by supplying a starting upward air flow from the duct 136. Calibrated heptane flow rates are discharged from the individual liquid fuel nozzles 104, and ignited. The peripheral shield 106 of each burner 100 can induce a high air velocity inside the shield 106 during operation, for example, to deflect water droplets from entering the shield 106 and contacting the fuel nozzle 104. The upper shield 102 can also deflect water droplets from contacting the fuel nozzle 104 from above. Additionally or alternatively, the upper shield 102 can also create a recirculation zone above or below the burner 100 for flame stabilization. The pilot flame manifold 110 emits a ring of pilot flames to serve as a constant igniter for the fire plume, and can dramatically reduce the standoff distance between the flame and the corresponding liquid fuel nozzle 104. Additionally or alternatively, the pilot flame manifold 110 can increase the temperature of the upper shield 102 to expedite heptane droplet vaporization, thereby maintaining sustainable flames under extremely turbulent conditions (e.g., under strong sprinkler sprays). As mentioned previously, the deflector disk 138 can maintain an air recirculation zone below the first burner 132 when air is discharged from the duct 136. The features mentioned above, when implemented individually, can result in a fire plume generator 130 having a high flame capacity, making it possible to test larger and/or more robust sprinkler systems. Moreover, when combined, the features result in a fire plume generator 130 having an even higher flame capacity. For example, an embodiment of the fire plume generator 130 can be used to simulate rack-storage fire plumes expected at first sprinkler actuations in warehouses up to 60 feet high, or higher, assuming a tall enough facility.

The table below lists example parameters for liquid fuel discharge from the liquid fuel nozzle(s) 104 that can be used to provide a convective heat release for the fire plume generator 130 ranging from about 0.50 MW to about 7.5 MW.

| Convective Heat Release Rate (MW) | Nozzle Capacity of Center Burner at 6.9 bar (GPH) | Nozzle Capacity of Peripheral Burners at 6.9 bar (GPH) | Estimated Nozzle Operating Pressure (bar) | Estimated Total Discharge Rate (gpm) |
|---|---|---|---|---|
| 0.50 | About 4 | About 3 | About 4 | About 1.5 |
| 7.50 | About 45 | About 45 | About 7 | About 25 |

Figure 11:
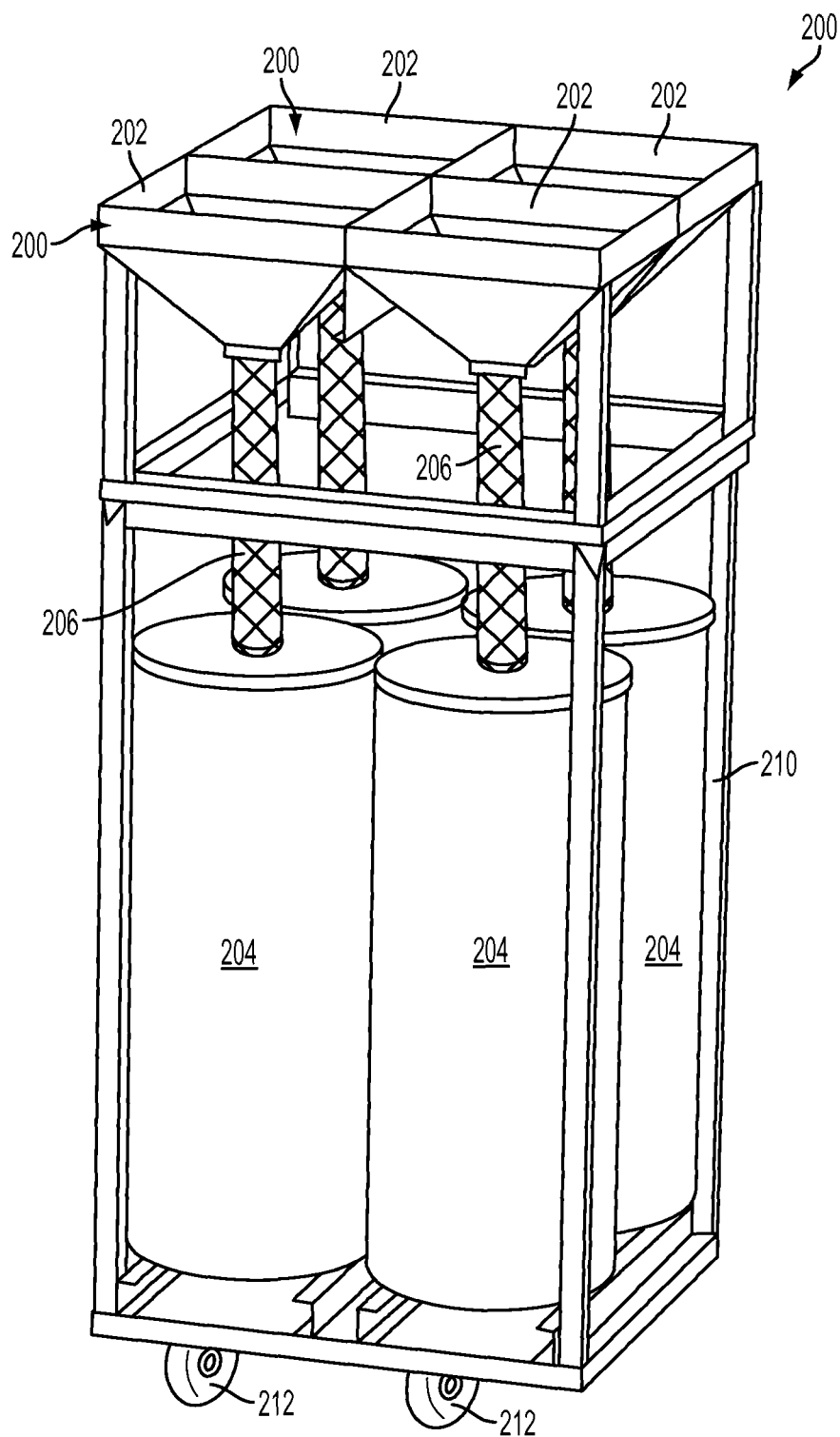
FIG. 11 is a perspective view of an example horizontal fluid collection device according to the present invention.
Figure 12A:
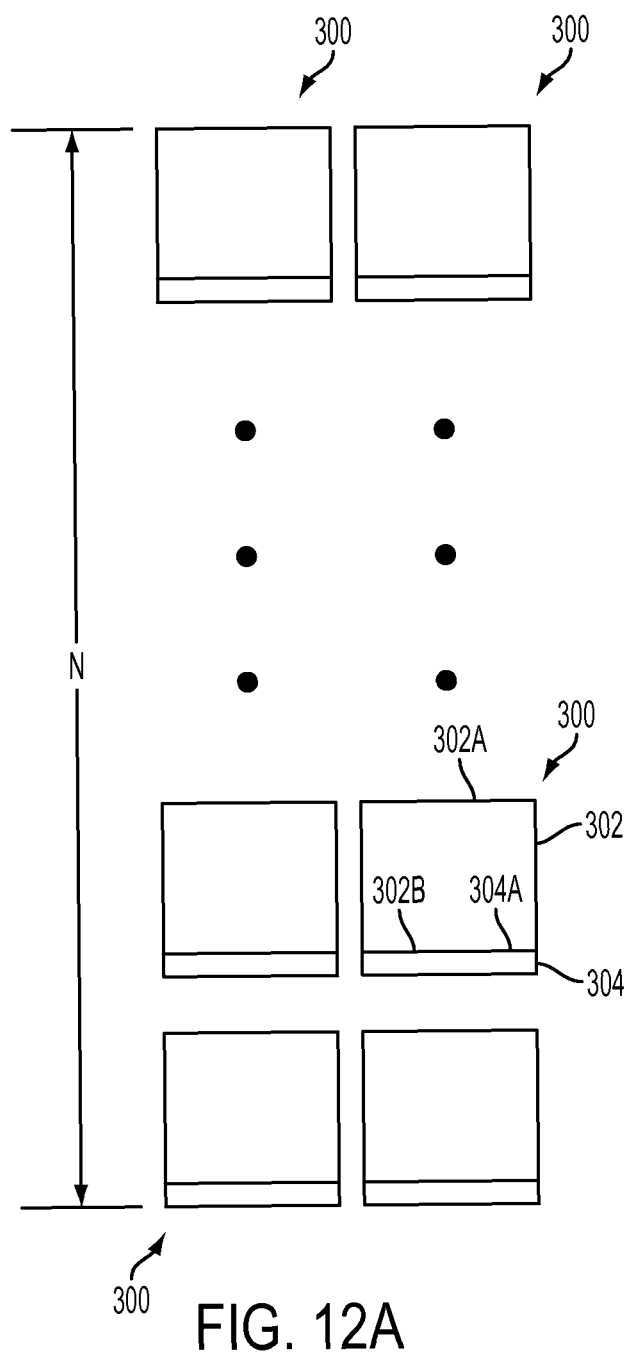
FIG. 12A is a front view of a plurality of vertical fluid collection devices stacked multiple tiers high according to an embodiment of the present invention.
Figure 12B:
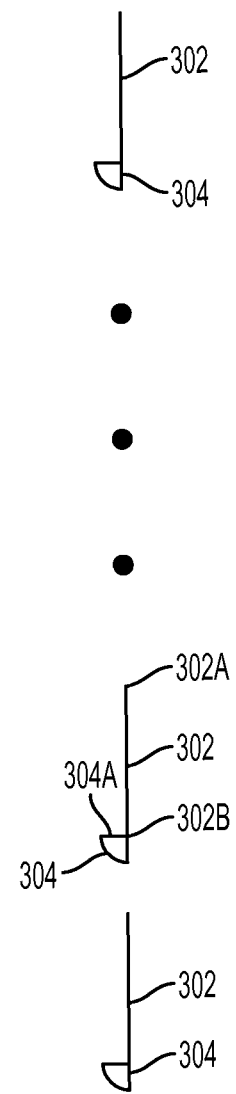
FIG. 12B is a side view of the vertical fluid collection devices shown in FIG. 12A.
Figure 13A:
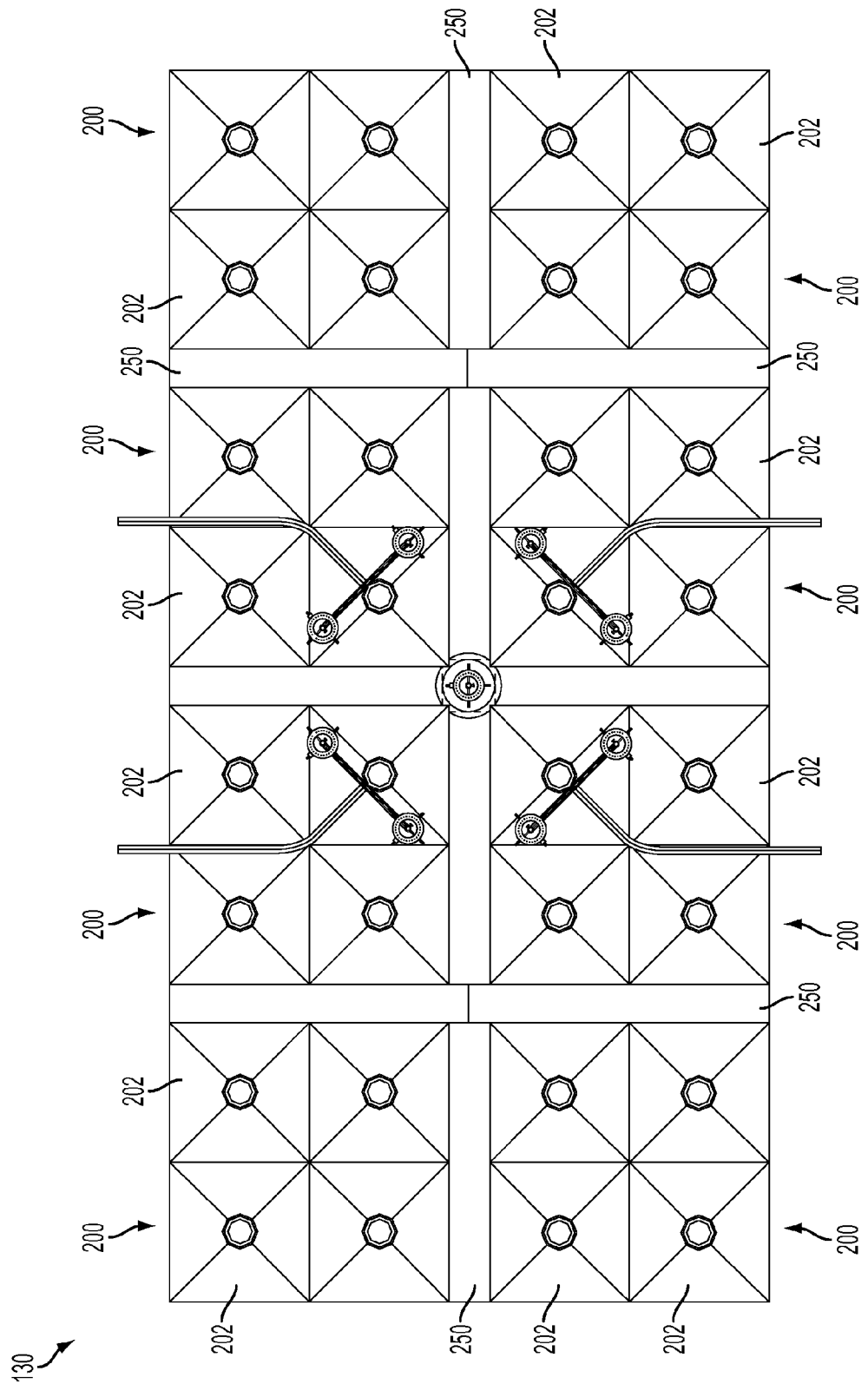
FIG. 13A is a top view of a fire plume generator centered above an array of horizontal collection devices according to an embodiment of the present invention.
Figure 13B:
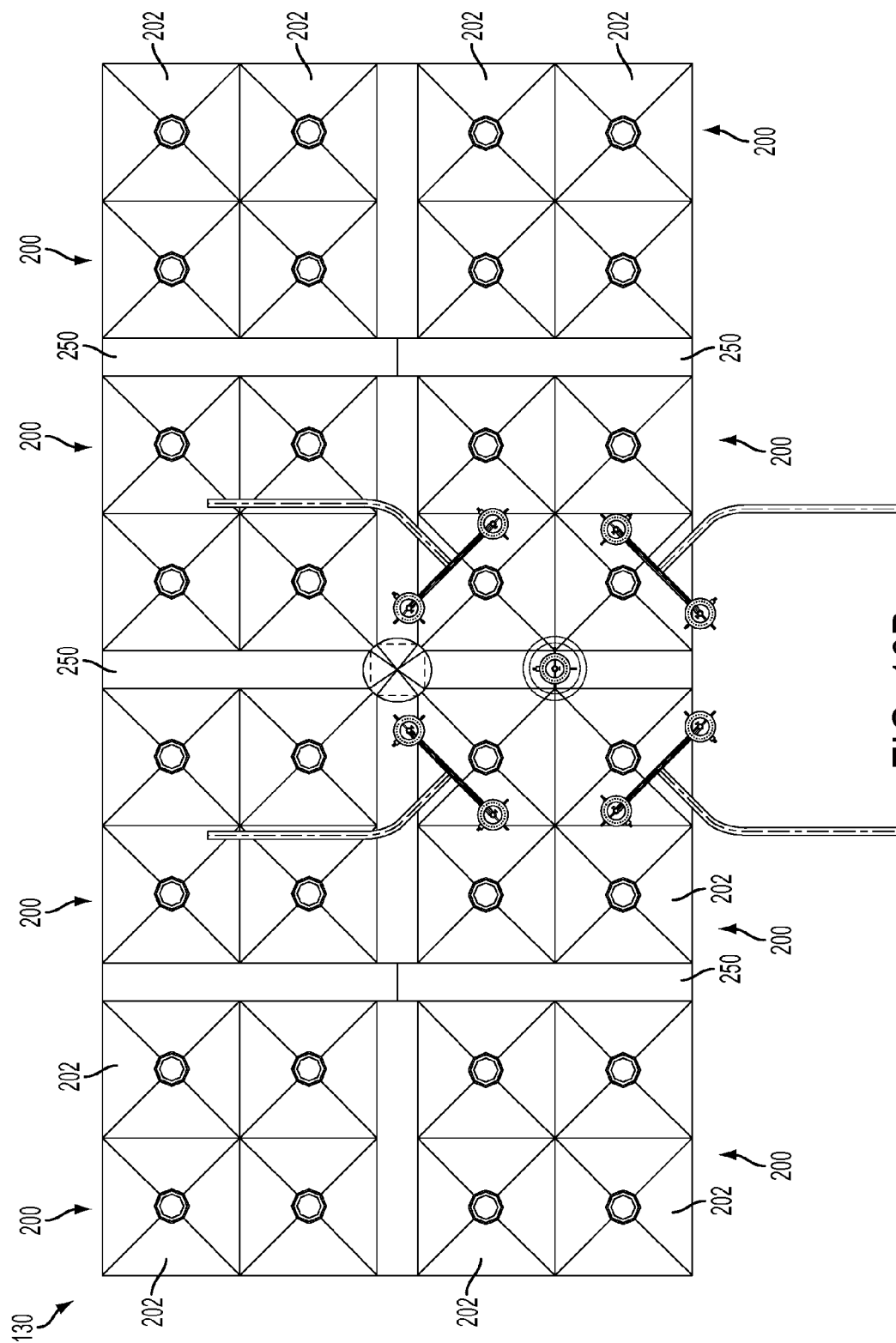
FIG. 13B is a top view of the fire plume generator and horizontal collection devices of FIG. 13A, shown with the collection devices offset by one collection device.

Referring to FIGS. 11-13B, components of a fluid collection system for use in a fire safety protection evaluation system are shown. FIGS. 11, 13A, and 13B depict a plurality of horizontal collection devices 200, while FIGS. 12A and 12B depict a plurality of vertical collection devices 300. The fire plume generator 130 can be used in conjunction with the horizontal collection devices 200 and/or vertical collection devices 300 to test a fire safety protection system, for example, to measure the amount of fluid delivered by a sprinkler system to the surfaces of burning pallets, and/or the surfaces of adjoining pallets. For example, the fire plume generator 130 can generate a fire plume underneath a sprinkler system, and the horizontal collection devices 200 can be used to measure the amount of fluid delivered by the sprinkler system to horizontal surfaces of the burning rack storage located underneath the sprinkler system (e.g., the ADD distribution). Likewise, the vertical collection devices 300 can be used to measure the amount of fluid delivered by the sprinkler system to the vertical surfaces of a target rack storage facing the burning rack storage (e.g., facing the horizontal collection devices 200).

Referring to FIG. 11, each horizontal collection device 200 can comprise a substantially horizontal fluid collection pan 202 having an open top for collecting fluids, such as water, dispensed by sprinklers. Each horizontal collection device 200 can also include a storage container 204, such as a tank, in fluid communication with the collection pan 202, to receive and measure the fluid received by the respective collection pan 202. For example, as shown in FIG. 11, the collection pan 202 can be connected to the respective storage container 204 using a conduit 206. Alternatively, the collection pan 202 could connect directly to the respective storage container 204. Each of the horizontal collection devices can include a measuring device (hidden from view), such as a pressure transducer in the storage container 204, to measure the amount of fluid in the container 204, and/or to measure the rate of fluid entering the container 204. As a result, each vertical collection device 200 can measure the amount and/or rate of fluid landing on the open upper surface of the respective collection pan 202.

Still referring to FIG. 11, a horizontal collection device 200 can comprise multiple collection pans 202 located on a frame to facilitate movement and arrangement of the collection pans 202 as a unit, for example, to place them in desired locations and/or patterns with respect to a fire plume (e.g., from the position shown in FIG. 13A to the position shown in FIG. 13B, to be discussed in more detail below). The embodiment shown in FIG. 11 includes a 2×2 array of horizontal collection pans 202 mounted on a frame 210. As shown, the frame 210 can support each horizontal pan 202, storage container 204, and measuring device. According to the embodiment shown, the collection pans 202 can be located above the respective storage container 204, however other configurations are possible. The frame 210 can include wheels 212 or other similar devices to facilitate transport of the unit. A solenoid can be included in each storage container 204 to open and close a valve, in order to facilitate emptying of the storage container 204.

Referring to FIGS. 12A and 12B, front and side views of vertical collection devices 300 according to an embodiment are shown. Each vertical collection device 300 can include a substantially vertical collection surface 302, e.g., that is impacted by fluid and on which the fluid collects, and a trough 304 for collecting the fluid that runs down the collection surface 302. More specifically, according to an embodiment, each substantially vertical collection surface 302 can have an upper edge 302A and a lower edge 302B, and the trough 304 can be located at and extend along the lower edge 302B. The trough 304 can have an open top surface 304A that is substantially perpendicular to the substantially vertical collection surface 302, through which the fluid passes to be collected in the trough 304.

According to an embodiment, each substantially vertical collection surface 302 can measure approximately 42" by 42", corresponding to the vertical surface area of one pallet load. Other dimensions for the vertical collection surface 302 can alternatively be used, for example, to simulate different sized commodities. As shown in FIGS. 12A and 12B, the vertical collection devices 300 can be arranged in an array that is two units wide by "N" tiers tall corresponding to two pallet loads wide and N pallet loads high of target rack storage. According to an embodiment, side-by-side collection devices 300 can be separated by approximately 6", and vertically stacked collection devices 300 can be separated by approximately 18", corresponding to the vertical and horizontal flues in standard rack-storage testing arrangements. However, according to alternative embodiments, other dimensions for the vertical and horizontal separation can be used, to simulate different stacking configurations.

Similar to the horizontal collection devices 200, each vertical collection device 300 can include a storage container (not shown) located below the trough 304, e.g., connected thereto by a conduit, and a measuring device (e.g., a pressure transducer) associated with the storage container to measure the amount and/or rate of fluid collected by the vertical collection device 300. As shown in FIGS. 12A and 12B, the vertical collection devices 300 can be stacked above one another in multiple tiers, for example, to simulate multiple stacked pallets. A frame (not shown) can be used to support the vertical collection devices 300 and related storage containers and measuring devices.

Referring to FIGS. 13A and 13B, an array of horizontal water collection devices 200 is shown centered beneath the fire plume generator 130. In the embodiment shown, each horizontal collection pan 202 can have a substantially horizontal collection surface measuring approximately 21" by 21", to simulate the top surface of a 21" by 21"×21" carton. As such, each horizontal collection device 200 can simulate the top surface of a 42" by 42" pallet load, however, other sizes may be used as needed. In FIG. 13A, the fire plume generator 130 is centered over an array of horizontal collection devices 200 that is two devises 200 wide by four devises 200 long, representing the top surfaces of the four ignition stacks in a warehouse commodity fire, and the stacks adjacent to the ignition stacks, two on each side.

According to an embodiment, a gap of approximately 6" exists between the horizontal collection devices 200 to represent the vertical flues between adjacent rack storages. Alternative embodiments may use larger or smaller gaps to simulate different sized flues. As shown, rectangular horizontal water collection devices 250 can be located in the spaces between the horizontal collection devices 200, and can collect water that lands in the flue space (e.g., between adjacent collection devices 200). The rectangular horizontal collection devices 250 can each include a container and a measuring device (similar to horizontal collection devices 200) to measure the amount and/or rate of fluid collected by the rectangular collection devices 250 in the flue space.

The eight pans 202 located to the left and another eight located to the right of the four ignition stacks represent the top surfaces of target stacks adjacent to the ignition stacks. FIG. 13B shows the array of collection devices 200 after having been offset with respect to the fire plume generator 130 by approximately one-half of a stack, for example, by rolling the horizontal collection devices 200 on the wheeled frame 210. One of ordinary skill in the art will appreciate from this disclosure that the horizontal collection devices 200 are not limited to the dimensions and arrangements shown in FIGS. 13A and 13B, and that other dimensions and array sizes are possible based, for example, on the type of testing being performed.

Although not specifically shown in FIGS. 13A and 13B, according to an embodiment, one or more tiers of the vertical collection devices 300 can be arranged around an array of the horizontal collection devices 200. In such an embodiment, the horizontal collection devices 200 can measure fluid deposited on the top surfaces of stacks during a fire, and the vertical collection devices 300 can measure fluid deposited on the sides of stacks facing the horizontal collection devices 200. For example, in FIGS. 13A and 13B, one or more vertical collection devices 300 can be placed around the array of horizontal collection devices 200, for example with the substantially vertical collection surfaces 302 and troughs 304 facing the horizontal collection devices 200.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A burner for a fire plume generator, comprising:
   a liquid fuel nozzle directed along a first axis;
   a peripheral shield extending around the liquid fuel nozzle, the peripheral shield extending substantially along the first axis and defining an upper end and a lower end;
   a pilot flame manifold located at or above the upper end of the peripheral shield, the pilot flame manifold defining a plurality of pilot flame outlets; and
   an upper shield located above the pilot flame manifold, the upper shield including a first portion extending substantially perpendicular to the first direction and covering the entire pilot flame manifold, the first portion including a central opening;
   wherein the upper shield is mounted to the burner such that a distance along the first axis between the upper shield and the pilot flame manifold is adjustable.

2. The burner of claim 1, further comprising a duct below the burner, the duct adapted to produce upward air flow toward the burner.

3. The burner of claim 1, wherein the peripheral shield is substantially cylindrical, and defines a central axis substantially aligned with the first axis.

4. The burner of claim 1, wherein the pilot flame manifold is connected to the upper end of the peripheral shield.

5. The burner of claim 4, wherein the pilot flame manifold is integral with the peripheral shield.

6. The burner of claim 1, wherein the pilot flame manifold is substantially ring shaped, and the plurality of pilot flame outlets are distributed around the ring shape.

7. The burner of claim 1, wherein each pilot flame outlet in the pilot flame manifold comprises a micro-nozzle.

8. The burner of claim 1, further comprising a source of liquid fuel in communication with the liquid fuel nozzle, and a source of gaseous fuel in communication with the pilot flame outlets.

9. A fire plume generator, comprising:
   a first burner and plurality of second burners arranged around the first burner, wherein each of the first and second burners comprises a liquid fuel nozzle, a peripheral shield extending around the liquid fuel nozzle, and a pilot flame manifold located at or above an upper end of the peripheral shield;
   a source of liquid fuel in communication with the liquid fuel nozzles;
   a source of gaseous fuel in communication with the pilot flame manifolds; and
   a duct located below the first burner, the duct connected to a blower to produce upward airflow toward the first burner.

10. The fire plume generator of claim 9, wherein each of the first and second burners further comprises an upper shield located above the pilot flame manifold, the upper shield including a first portion covering the pilot flame manifold and a central opening for the fire plume.

11. The fire plume generator of claim 9, wherein each pilot flame manifold is substantially cylindrical, and includes a plurality of pilot flame outlets distributed around the ring shape.

12. The fire plume generator of claim 9, wherein each liquid fuel nozzle is directed along an axis, and each peripheral shield is substantially cylindrical and defines a central axis substantially aligned with the respective axis.

13. The fire plume generator of claim 9, wherein each pilot flame manifold is connected to the upper end of the respective peripheral shield.

14. The fire plume generator of claim 9, wherein the first and second burners collectively produce a heat output of at least about 7,000 kW.

15. A burner for a fire plume generator, comprising:
a liquid fuel nozzle directed along a first axis;
a peripheral shield extending around the liquid fuel nozzle, the peripheral shield extending substantially along the first axis and defining an upper end and a lower end;
a pilot flame manifold located at or above the upper end of the peripheral shield, the pilot flame manifold defining a plurality of pilot flame outlets; and
an upper shield located above the pilot flame manifold, the upper shield including a first portion extending substantially perpendicular to the first direction and covering the pilot flame manifold, the first portion including a central opening;

wherein the upper shield further comprises a second portion extending substantially parallel to the first axis.

16. A burner for a fire plume generator, comprising:
a liquid fuel nozzle directed along a first axis;
a peripheral shield extending around the liquid fuel nozzle, the peripheral shield extending substantially along the first axis and defining an upper end and a lower end; and
a pilot flame manifold located at or above the upper end of the peripheral shield, the pilot flame manifold defining a plurality of pilot flame outlets;
a duct below the burner, the duct adapted to produce upward air flow toward the burner; and
a deflector disk located between the duct and the lower end of the peripheral shield.

17. A fire plume generator, comprising:
a first burner and plurality of second burners arranged around the first burner, wherein each of the first and second burners comprises a liquid fuel nozzle, a peripheral shield extending around the liquid fuel nozzle, and a pilot flame manifold located at or above an upper end of the peripheral shield;
a source of liquid fuel in communication with the liquid fuel nozzles;
a source of gaseous fuel in communication with the pilot flame manifolds;
a duct located below the first burner, the duct adapted to produce upward airflow toward the first burner; and
a deflector disk located between the duct and the first burner.

* * * * *